(12) United States Patent
Tian et al.

(10) Patent No.: US 10,815,158 B2
(45) Date of Patent: Oct. 27, 2020

(54) SELENIUM-ENRICHING ENHANCER FOR PLANT CULTIVATION AND PREPARATION AND USE THEREOF

(71) Applicant: Wuhan SunEn-Tech Co., Ltd., Hubei (CN)

(72) Inventors: Xike Tian, Wuhan (CN); Longyan Wang, Wuhan (CN); Lei Zhu, Wuhan (CN); Huifen Ma, Wuhan (CN); Ming Zhang, Wuhan (CN); Dongyue Luo, Wuhan (CN); Zhaoxin Zhou, Wuhan (CN)

(73) Assignee: WUHAN SUNEN-TECH CO., LTD., Wuhan, Hubei (CN)

(*) Notice: Subject to any disclaimer, the term of this patent is extended or adjusted under 35 U.S.C. 154(b) by 240 days.

(21) Appl. No.: 15/765,373

(22) PCT Filed: Dec. 21, 2016

(86) PCT No.: PCT/CN2016/111216
§ 371 (c)(1),
(2) Date: Apr. 2, 2018

(87) PCT Pub. No.: WO2017/121229
PCT Pub. Date: Jul. 20, 2017

(65) Prior Publication Data
US 2018/0282236 A1    Oct. 4, 2018

(30) Foreign Application Priority Data
Jan. 13, 2016   (CN) .......................... 2016 1 0020705

(51) Int. Cl.
| | | |
|---|---|---|
| *C05C 11/00* | (2006.01) | |
| *C05D 9/02* | (2006.01) | |
| *A01N 55/00* | (2006.01) | |
| *C05G 3/00* | (2020.01) | |
| *A01C 21/00* | (2006.01) | |

(52) U.S. Cl.
CPC .............. *C05C 11/00* (2013.01); *A01C 21/00* (2013.01); *A01N 55/00* (2013.01); *C05D 9/02* (2013.01); *C05G 3/00* (2013.01)

(58) Field of Classification Search
CPC ........... C05C 11/00; C05D 9/02; A01N 55/00; A01N 55/04; C05G 3/00; A01C 21/00; A01G 13/00
See application file for complete search history.

(56) References Cited

U.S. PATENT DOCUMENTS 4,988,517 A    1/1991  El-Bayoumy

FOREIGN PATENT DOCUMENTS

| CN | 1088725 A | 7/1994 |
| CN | 103120107 A | 5/2013 |
| CN | 102795938 B * | 8/2014 |
| CN | 104511290 A * | 4/2015 |
| CN | 105210780 A | 1/2016 |
| CN | 105638720 A | 6/2016 |
| KR | 10-1235675 B1 | 2/2013 |
| WO | WO-2014/202507 A1 | 12/2014 |

OTHER PUBLICATIONS

Rao, Chinthalapally V., et al. "Chemoprevention of colon cancer by a glutathione conjugate of 1, 4-phenylenebis (methylene) selenocyanate, a novel organoselenium compound with low toxicity." Cancer research 61.9 (2001): 3647-3652.*

Liu, Chaomei et al., The Synthesis and Chemopreventive Effects of Organoselenocyanate Compounds, Chinese Journal of Modern Applied Pharmacy, vol. 16, No. 06, Dec. 28, 1999, ISSN: 1007-7693, pp. 30-31.

* cited by examiner

*Primary Examiner* — Jennifer A Smith

(74) *Attorney, Agent, or Firm* — Muncy, Geissler, Olds & Lowe, P.C.

(57) ABSTRACT

A selenium-rich enhancer for plant cultivation and preparation and application thereof. The selenium-rich enhancer contains: an organic selenocyano-compound. The organic selenocyano-compound is selected from one or a combination of the compounds of the structure of Formula I or Formula II, Formula I: R—SeCN, wherein, R is alkyl or aromatic groups; and Formula II: (R—SeCN)$_n$A, wherein, R is alkyl or aromatic groups, n is an integer of 1-5, and A is a cation. The selenium-rich enhancer is employed to cultivate plants by utilizing the organic selenocyano-compound, and the survival rates, yields and organic selenium contents of plants are all improved. When pepper is planted by using that, the selenium content can reach more than 180 μg/kg.

4 Claims, No Drawings

SELENIUM-ENRICHING ENHANCER FOR PLANT CULTIVATION AND PREPARATION AND USE THEREOF

TECHNICAL FIELD

The present invention relates to the field of plant cultivation, and particularly to a selenium-rich enhancer for plant cultivation and preparation and application thereof.

BACKGROUND ART

Selenium is one of indispensable microelements for human body. Selenium is an important component of glutathion peroxidase, and is also an antioxidant, which participates in eliminating the free radicals and lipid peroxides that are generated by in vivo metabolism, to protect cells and organs such as heart, liver, kidney and lung, and prevent DNA injury. Selenium nourishment can increase the activities of glutathion peroxidase (GSH-Px) and superoxide dismutase (SOD), thereby achieving the purposes of improving the immunologic function of organism and the ability to resist diseases, mitigating the decay of the functions of human body, and delaying senility.

A great amount of information at home and abroad indicates that, environmental selenium deficiency seriously affects the health of human being and animals. The four major diseases that threaten the life and health of human being, hepatic diseases, cancers, cardiovascular and cerebrovascular diseases and digestive tract diseases, all have relation with selenium deficiency. Selenium deficiency is a commonly existing problem. More than 40 countries in the world have selenium deficiency in the soil, and China has a slip of low selenium zone that extends from the northeast to the southwest; for example, provinces such as the Heilongjiang province and the Yunnan province are selenium deficiency provinces. The medical science proves that a proper quantities of selenium can enhance the immunologic function, suppress cancer cell growth, has anticancer effect, and can well prevent and treat coronary arteriosclerosis insufficient blood supply.

For selenium deficiency zones, the adding or injection of inorganic sodium selenite into foods has defects such as low absorption and utilization rate, poor safety and adverse influence on the meat quality. Therefore, the best way of selenium nourishment is by employing organic selenium nourishment, and biological source selenium nourishment is more desirable. One of the best approaches of the selenium nourishment of human body is by eating selenium-rich subsidiary agricultural products.

At present, there are many selenium-rich products in the prior art, such as selenium-rich rice and selenium-rich tea. The selenium contents of plants are generally improved by spraying sodium selenite solution, selenium-rich plant extracting solution or selenium yeast fermentation products. The disadvantage is that, if the spraying of sodium selenite solution serves as the selenium source of plants, because sodium selenite itself has toxicity and the absorptivity of plants is low, the residue easily affects the safety of food plants. If selenium-rich plant extracting solution or selenium yeast fermentation products serve as the selenium source of plants, because the technical process of acquiring the selenium-rich products is complicated and the production cycle is very long, the production cost is high, which affects the economy of the agricultural products, and results in that the selenium-rich agricultural products are hard to be broadly accepted by the market. There is not a selenium-rich enhancer for planting that has convenient use, low cost, high safety and no toxicity in the market.

Technical Problems

The technical problems that the present invention seeks to solve are that the technical process of the selenium-rich products in the prior art is complicated and the production cycle is very long, so the production cost is high, which affects the economy of the agricultural products, and that there is not a selenium-rich enhancer for planting that has convenient use, low cost, high safety and no toxicity in the prior art.

SUMMARY OF THE DISCLOSURE

The selenium-rich enhancer for plant cultivation that is provided by the present invention contains: an organic selenocyano-compound, wherein, the organic selenocyano-compound is selected from one or a combination of the compounds of the structure of Formula I or Formula II, Formula I: R—SeCN, wherein, R is alkyl or aromatic groups; and Formula II: $(R-SeCN)_n A$, wherein, R is alkyl or aromatic groups, n is an integer of 1-5, and A is a cation.

Preferably, the selenium-rich enhancer for plant cultivation further comprises surface wetting agents.

Preferably, the organic selenocyano-compound is 2-10 parts by weight, and the surface wetting agents is 1 part by weight.

Preferably, the selenium-rich enhancer for plant cultivation further comprises one or a combination of humic acid and boric acid. Further preferably, wherein the humic acid is 1-10 parts by weight, and the boric acid is 1-10 parts by weight.

Preferably, the selenium-rich enhancer for plant cultivation further comprises water, which is not more than 100 parts by weight.

Preferably, the selenium-rich enhancer for plant cultivation further comprises a fertilizer, wherein the fertilizer may be one or a combination of a commercially available water-soluble solid state organic fertilizer or a commercially available microelement fertilizer, such as foliage fertilizer, root manure and suspension bottle nutrient fluid, wherein the foliage fertilizer, root manure and suspension bottle nutrient fluid may be an amino acid fertilizer, a compound fertilizer or a microelement fertilizer; and the fertilizer is not more than 100 parts by weight in the selenium-rich enhancer for plant cultivation.

Preferably, the organic selenocyano-compound is one or a combination of selenocyanoacetic acid, potassium selenocyanoacetate, sodium selenocyanoacetate, 1,4-Phenylenebis(methylene)selenocyanate, benzyl selenocyanate, phenyl selenocyanate and potassium selenocyano propyl sulfonate.

Preferably, the surface wetting agents is an anionic surfactant or a non-ionic surfactant. More preferably, the surfactant is one or a combination of an alkylphenol polyoxyethylene type surfactant, a tween type surfactant or sorbitol.

The present invention further provides a method for preparing the above selenium-rich enhancer for plant cultivation: mixing the components to obtain the selenium-rich enhancer.

The present invention further provides a method for using the above selenium-rich enhancer for plant cultivation:

applying the selenium-rich enhancer to a plant by foliage spray, suspension bottle infusion or root fertilization.

ADVANTAGEOUS EFFECTS

The present invention can achieve the following technical effects:

1. The selenium-rich enhancer of the present invention, by the reasonable composition of the components, can effectively promote plant growth and decrease disease and insect injury. According to tests, by cultivating by using the organic selenium plant selenium-rich enhancer that is provided by the present invention, the plant heights, survival rates and yields of plants are all improved. When pepper is planted by using that, the selenium content can reach more than 180 µg/kg.

2. The products of the present invention are rich in selenium, and by conducting foliage spray, root irrigation application or suspension bottle infusion to plants, it is absorbed by the plants and converted into selenium substituted amino acids, which can be easily absorbed by human body, so the agricultural products are rich in natural organic selenium. After eating, people can well absorb that and improve the immunity.

3. The selenium source of the present invention is organic selenocyano-compounds, which is one or a mixture of the selenocyano-compounds such as selenocyanoacetic acid, potassium selenocyanoacetate, sodium selenocyanoacetate, 1,4-Phenylenebis(methylene)selenocyanate, benzyl selenocyanate, phenyl selenocyanate and potassium selenocyano propyl sulfonate. They are artificially synthesized, and the products have high purity, low toxicity, good water solubility and good absorption by plants, which facilitates the accurate control on the selenium contents of the plant products.

4. The selenium source of the present invention is organic selenocyano-compounds, and compared with sodium selenite and sodium selenate, the organic selenocyano-compounds have lower toxicity and higher safety. Compared with yeast selenium and biologically extracted organic selenium, the artificially synthesized organic selenocyano-compounds have clear components, high safety to human being and animals, simple production process, and high product purity, and facilitate quantitative spraying and plant absorption.

5. The method for using the enhancer of the present invention is flexible, wherein it may be solely applied to plants by foliage spray, suspension bottle infusion or root fertilization, and may also be used with conventional inorganic nutrient fluid foliage fertilizers, organic amino acid nutrient foliage fertilizers, suspension bottle nutrient fluid or root manure.

DETAILED DESCRIPTION OF THE DISCLOSURE

The present invention will be further illustrated below by referring to the particular embodiments, to enable a person skilled in the art to better understand and implement the present invention, but the embodiments are not taken as limiting the present invention.

The selenium-rich enhancer for plant cultivation that is provided by the present invention comprises an organic selenocyano-compound and a surface wetting agents, and the organic selenocyano-compound is selected from one or a combination of the compounds of the structure of Formula I or Formula II, Formula I: R—SeCN, wherein, R is alkyl or aromatic groups; and Formula II: $(R-SeCN)_n A$, wherein, R is alkyl or aromatic groups, n is an integer of 1-5, and A is a cation (which may be a metal ion such as potassium, sodium, magnesium and aluminum, and may also be other cations).

The selenium-rich enhancer of the present invention is rich in organic selenium, and by conducting foliage spray, root irrigation application or suspension bottle infusion to plants, it is absorbed by the plants and converted into selenium substituted amino acids, which can be easily absorbed by human body, so the agricultural products are rich in the organic selenium. After eating, people can well absorb that and improve the immunity.

The selenium-rich enhancer for plant cultivation of the present invention may further comprise water, a fertilizer, humic acid or boric acid, to promote the absorption and conversion of the organic selenocyano-compound by plants.

The method for preparing the selenium-rich enhancer for plant cultivation that is provided by the present invention is: mixing the components to obtain the selenium-rich enhancer.

The method for using the selenium-rich enhancer for plant cultivation of the present invention is flexible, wherein it may be solely applied to plants by foliage spray, suspension bottle infusion or root fertilization, and may also be used with conventional inorganic nutrient fluid foliage fertilizers, organic amino acid nutrient foliage fertilizers, suspension bottle nutrient fluid or root manure.

The present invention will be further illustrated below by referring to several examples:

The components and the corresponding parts by weight of the selenium-rich enhancers for plant cultivation of Examples 1-16 are shown in the following table.

|  | Organic selenocyano-compound | Surfactant | Water | Solid state fertilizer | Liquid state fertilizer | Humic acid | Boric acid |
|---|---|---|---|---|---|---|---|
| Example 1 | potassium selenocyanoacetate, 4 parts | OP-20, 1 part | 100 parts | 0 | 0 | 0 | 0 |
| Example 2 | potassium selenocyanoacetate, 5 parts | OP-20, 1 part | 100 parts | 0 | 0 | 0 | 0 |
| Example 3 | potassium selenocyanoacetate, 6 parts | OP-20, 1 part | 100 parts | 0 | 0 | 0 | 0 |
| Example 4 | benzyl selenocyanate, 2 parts | sorbitol, 1 part | 100 parts | 50 parts | 0 | 0 | 0 |
| Example 5 | benzyl selenocyanate, 10 parts | sorbitol, 1 part | 90 parts | 0 | 50 parts | 8 parts | 6 parts |
| Example 6 | phenyl selenocyanate, 2 parts | OP-10, 1 part | 100 parts | 0 | 0 | 1 part | 0 |

|  | Organic selenocyano-compound | Surfactant | Water | Solid state fertilizer | Liquid state fertilizer | Humic acid | Boric acid |
|---|---|---|---|---|---|---|---|
| Example 7 | phenyl selenocyanate, 10 parts | OP-10, 1 part | 90 parts | 0 | 0 | 0 | 10 parts |
| Example 8 | potassium selenocyano propyl sulfonate, 5 parts | tween-80, 1 part | 100 parts | 10 parts | 0 | 10 parts | 0 |
| Example 9 | potassium selenocyano propyl sulfonate, 8 parts | tween-80, 1 part | 100 parts | 0 | 10 parts | 0 | 2 parts |
| Example 10 | potassium selenocyano propyl sulfonate, 10 parts | tween-80, 1 part | 100 parts | 0 | 8 parts | 5 parts | 1 part |
| Example 11 | potassium selenocyano propyl sulfonate, 10 parts | tween-80, 1 part | 100 parts | 0 | 8 parts | 0 | 0 |
| Example 12 | sodium selenocyanoacetate, 5 parts; 1,4-Phenylenebis(methylene)selenocyanate, 5 parts | tween-80, 1 part | 100 parts | 0 | 8 parts | 5 parts | 1 part |
| Example 13 | sodium selenocyanoacetate, 5 parts; 1,4-Phenylenebis(methylene)selenocyanate, 5 parts | tween-80, 2 parts | 100 parts | 0 | 8 parts | 5 parts | 1 part |
| Example 14 | potassium selenocyano propyl sulfonate, 15 parts | tween-80, 1 part | 100 parts | 0 | 8 parts | 5 parts | 1 part |
| Example 15 | potassium selenocyano propyl sulfonate, 10 parts | tween-80, 1 part | 100 parts | 50 parts | 50 parts | 5 parts | 1 part |
| Example 16 | potassium selenocyano propyl sulfonate, 10 parts | tween-80, 1 part | 100 parts | 0 | 8 parts | 15 parts | 1 part |
| Example 17 | potassium selenocyano propyl sulfonate, 10 parts | 0 | 100 parts | 0 | 0 | 0 | 0 |
| Comparative Example 1 | 0 | OP-20, 1 part | 100 parts | 0 | 0 | 0 | 0 |
| Comparative Example 2 | sodium selenite 2 parts | OP-10, 1 part | 100 parts | 0 | 0 | 0 | 0 |

The solid state fertilizers that are employed in the Examples are commercially available water-soluble solid state organic fertilizers (for example, the Fu Jin Men water flush fertilizer that is produced by Henan Qiangsheng Agricultural Science and Technology Development Limited Company), and the liquid state fertilizers are commercially available microelement fertilizers (for example, the Shou Kang No. 1 nutrient fluid that is produced by Huzhou Shou Kang Biological Science and Technology Limited Company).

The planting test takes pepper planting as the example, and conducts routine seed presprouting, seeding, and seedbed and field management of pepper. The planting area is 40 m², and the row spacings between the plants are 40×80 cm. The selenium-rich enhancers of each of the Examples are diluted by water by 500 times, and used to conduct foliage spray, which was conducted once individually in the blooming and fruit setting phase and the fruit expanding phase of the pepper.

The test result is as shown in Table 1.

|  | Survival rate (%) | Yield (kg) | Total selenium content (µg/kg) |
|---|---|---|---|
| Example 1 | 92.6 | 130 | 95.6 |
| Example 2 | 93.1 | 133 | 106.2 |
| Example 3 | 92.7 | 131 | 114.1 |
| Example 4 | 92.8 | 135 | 74.3 |
| Example 5 | 93.5 | 135 | 188.9 |
| Example 6 | 93.4 | 130 | 65.3 |
| Example 7 | 92.1 | 128 | 181.5 |
| Example 8 | 93.2 | 130 | 98.5 |
| Example 9 | 92.3 | 125 | 170.2 |
| Example 10 | 93.3 | 134 | 182.1 |
| Example 11 | 92.5 | 130 | 170.2 |
| Example 12 | 93.5 | 133 | 182.8 |
| Example 13 | 93.1 | 133 | 183.0 |
| Example 14 | 93.0 | 133 | 181.8 |
| Example 15 | 93.3 | 137 | 182.4 |
| Example 16 | 93.0 | 130 | 180.1 |
| Example 17 | 91.8 | 124 | 80.5 |
| Comparative Example 1 | 91.8 | 124 | 40.5 |
| Comparative Example 2 | 90.9 | 120 | 55.3 |

It can be seen from the result that, compared with water, which is used in Comparative Example 1, and the inorganic selenium compound (sodium selenite), which is used in Comparative Example 2, the selenium-rich enhancers for plant cultivation of Examples 1-16 of the present invention can significantly increase the selenium contents of the plants, and additionally increase the survival rates and yields of the plants.

The above embodiments are merely preferable embodiments that are presented to fully illustrate the present invention, and the protection scope of the present invention is not limited thereto. The equivalent substitutions or alternations that are made by a person skilled in the art on the basis of the present invention all fall within the protection scope of the present invention. The protection scope of the present invention is limited by the claims.

What is claimed is:

1. A selenium-rich enhancer for plant cultivation, wherein the selenium-rich enhancer comprises an organic selenocyano-compound; and
   the organic selenocyano-compound is selected from the compounds of Formula II, Formula II: $(R-SeCN)_nA$, wherein R is alkyl, carboxyl or aromatic groups, n is an integer of 1-5, and A is a cation, the organic selenocya no-compound is 2-10 parts by weight, the selenium-rich enhancer further comprises surface wetting agents, wherein the surface wetting agents are 1 part by weight, and the selenium-rich enhancer further comprises one or a combination of humic acid and boric acid, wherein the humic acid is 1-10 parts by weight, and the boric acid is 1-10 parts by weight.

2. The selenium-rich enhancer for plant cultivation according to claim 1, wherein the selenium-rich enhancer further comprises water.

3. The selenium-rich enhancer for plant cultivation according to claim 1, wherein the selenium-rich enhancer further comprises a fertilizer.

4. The selenium-rich enhancer for plant cultivation according to claim 1, wherein the organic selenocyano-compound is one or a combination of selenocyanoacetic acid, potassium selenocyanoacetate, sodium selenocyanoacetate and potassium selenocyano propyl sulfonate.

\* \* \* \* \*